Oct. 5, 1954
J. A. OBERMAIER ET AL
2,690,671
AIR VELOCITY METER
Filed Jan. 21, 1949
2 Sheets-Sheet 1
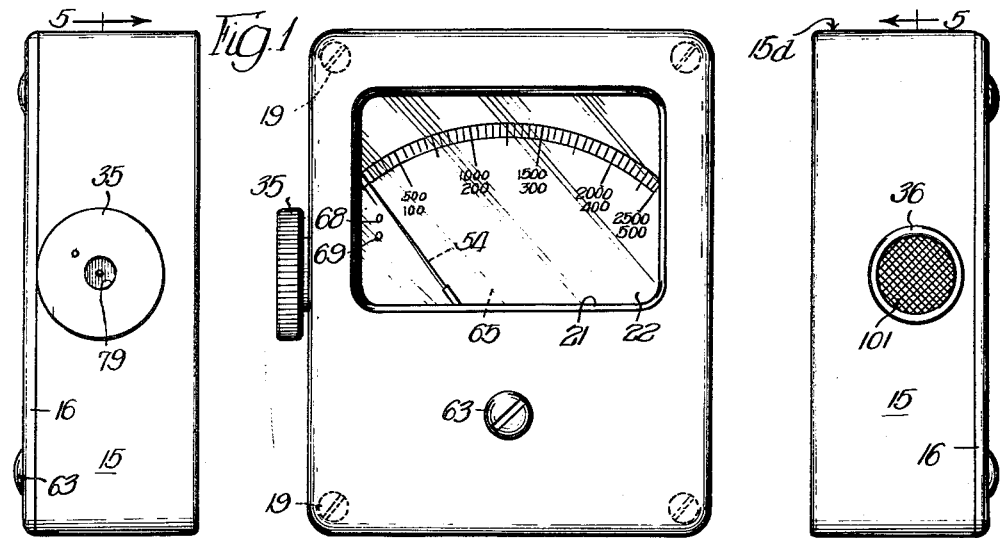
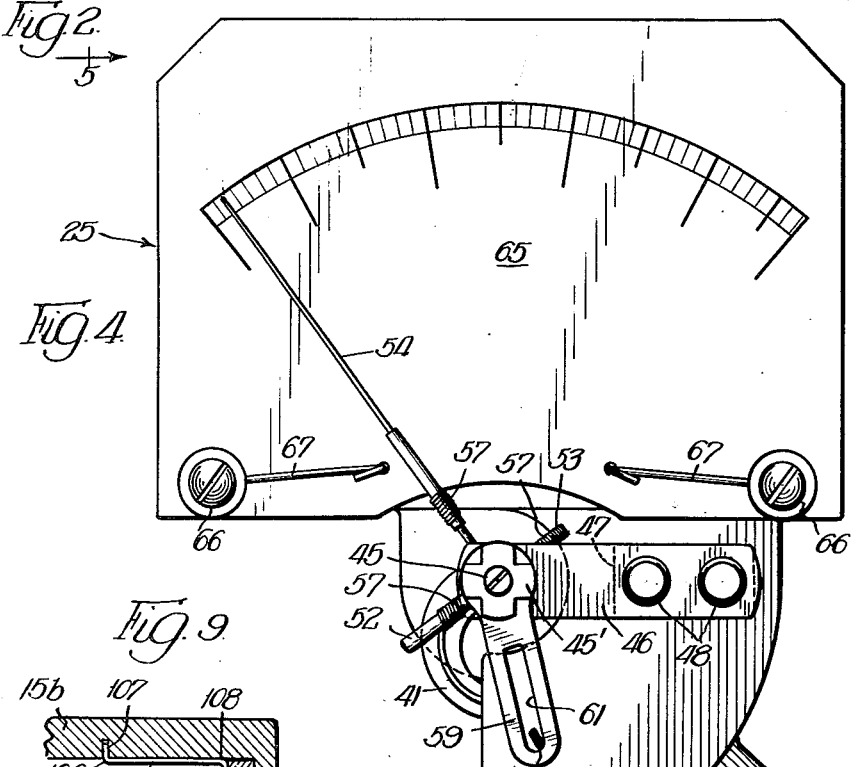
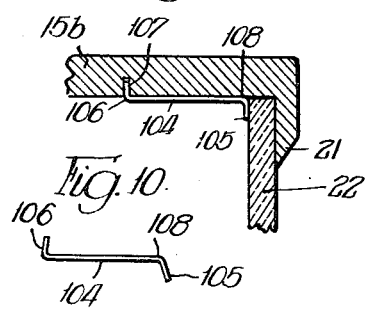
INVENTORS.
John A. Obermaier,
Alfred A. Obermaier,
BY Brown, Jackson, Boettcher & Dienner
ATT'YS

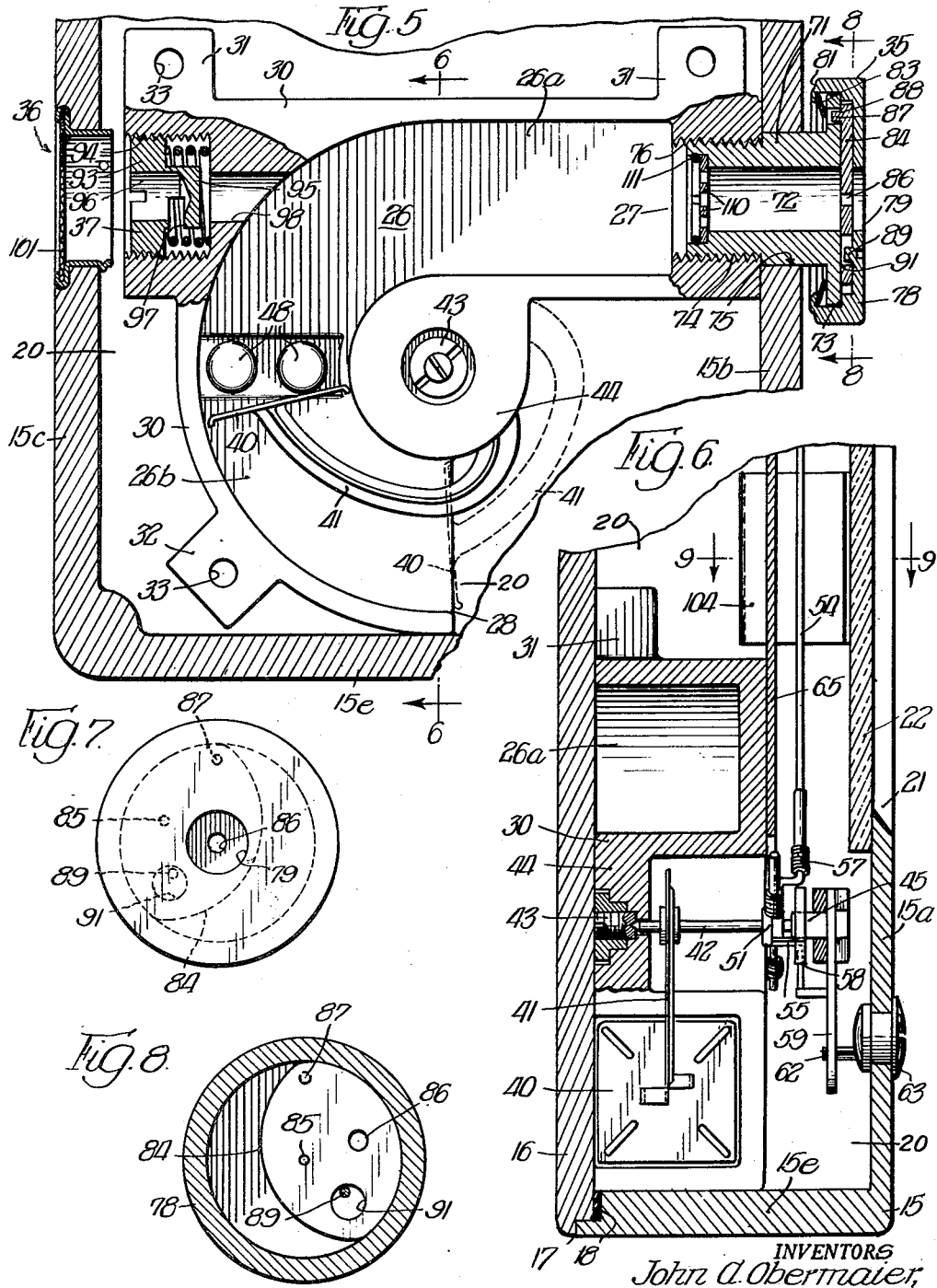

Patented Oct. 5, 1954

2,690,671

UNITED STATES PATENT OFFICE 2,690,671

AIR VELOCITY METER

John A. Obermaier and Alfred A. Obermaier, Chicago, Ill.

Application January 21, 1949, Serial No. 71,852

7 Claims. (Cl. 73—228)

The present invention relates to an air velocity meter of the portable type for use by air conditioning engineers, heating and ventilating engineers, contractors and the like. Such type of portable meter enables accurate determination to be made of the direction and velocity of air currents in different parts of a room or other enclosure, and to determine the velocities of air currents passing through inlet or exhaust ducts associated with an air conditioning system or the like.

One of the principal objects of the invention is to provide a portable air velocity meter of extremely small size, preferably sufficiently small so that it can be easily carried in one's coat pocket. For example, the preferred commercial embodiment of our invention is only 4 inches in height, 3 inches in width, and 1½ inches in depth, and weighs only 8 ounces. This small compact size, and light weight, greatly extend the field of utility of such a meter. For example, such a meter can be conveniently carried by dealers and salesmen who would not ordinarily carry a large meter or other field testing equipment, and in this sense the small meter aids as a sales promotion device.

Another object of the invention is to provide an air velocity meter of this small compact size and light weight which will have a high degree of sensitivity. One important feature of the invention contributing to this sensitivity is the use of a piston type of vane operating within a curved air channel which is closed on all sides. This piston type of vane has operative connection with the moving system of the meter through the medium of a curved arm which enters the discharge end of the curved air channel, and which follows the curvature of this channel in the movement of the piston vane therein. The outer end of this curved arm is secured to the rotatable pivot shaft which carries the pointer adapted to swing across the direct reading scale. In the preferred embodiment of the invention, the air channel is of rectangular or box-like cross-section, and is curved on an arc which is concentric of the axis of the pivot shaft. The piston vane has a perimeter of corresponding rectangular shape, and has a close non-contacting fit within the curved air channel. In this preferred embodiment, the curved box-like channel has the same cross-sectional area and shape from end-to-end, the scale gradation for different velocities being obtained by the opposing spring pressure which builds up with movement of the vane, and by the relatively small leakage of air around the non-contacting fit of the piston vane within the air channel. In view of the fact that the curved arm which carries the piston vane extends out of the air channel through its discharge end, it is desirable that this discharge end open into the interior of the surrounding casing, so as to protect the curved arm from mechanical injury while transporting the device in the pocket, etc.

Another feature of the invention resides in statically and dynamically balancing such a moving system characterized by a piston type of vane operating within a curved air channel through the medium of a curved connecting arm. By virtue of this statically and dynamically balanced relation of the moving system, the meter can be held in the hand and can be pointed horizontally, upwardly or downwardly, or at any other angle, without disturbing the accuracy of the meter reading. In this regard, another feature is the provision of a moving system which is sensitive for accuracy, but which can also withstand the shocks to which a portable meter is subjected.

Another object of the invention is to provide improved and simplified apparatus for extending the range of the instrument to a plurality of different range scales of widely different velocities. For example, the instrument can be operated on a relatively low range scale of from 0 to 500 feet velocity per minute, and then by a simple adjusting manipulation the instrument can be instantly converted to a higher range scale of from 0 to 2500 feet per minute.

Another feature of the invention is the provision of an improved adjustable bleeder for readily calibrating the meter.

Still another feature of the invention is the provision of an improved clip arrangement for readily retaining the sight window glass in place.

Other objects, features and advantages of the invention will appear from the following detailed description of one preferred embodiment thereof. In the accompanying drawings illustrating such embodiment:

Figure 1 is a front elevational view of our improved air velocity meter;

Figure 2 is a side elevational view of the left side of the meter, this being the side at which the air enters the instrument;

Figure 3 is a side elevational view of the right side thereof, this being the side from which the air discharges;

Figure 4 is a front elevational view on an enlarged scale of the sub-assembly comprising the air channel, moving system and dial card or plate, prior to the mounting of this sub-assembly within the outer casing;

Figure 5 is a fragmentary, vertical, sectional view through the meter from side-to-side thereof and looking toward the front, corresponding to a section taken approximately on the plane of the line 5—5 of Figures 2 and 3;

Figure 6 is a fragmentary, vertical, sectional view taken approximately on the plane of the line 6—6 of Figure 5;

Figure 7 is a front elevational view of the improved range selector;

Figure 8 is a vertical sectional view thereof taken approximately on the plane of the line 8—8 of Figure 5;

Figure 9 is a horizontal sectional view illustrating one of the window mounting clips, corresponding to a section taken on the plane of the line 9—9 of Figure 6; and Figure 10 illustrates the angular relation of the end flanges on these window mounting clips prior to mounting in the housing.

The housing of the meter comprises a box-like front casing section 15 which is closed by a removable rear cover plate 16. As shown at the bottom of Figure 6, the rear cover plate has a scarfed joint fit 17 with the front casing section, this joint being sealed by a rubber gasket 18. Both the casing section 15 and rear cover plate 16 are preferably composed of a suitable plastic material, and the rear cover plate is detachably secured to the front section by corner screws 19 (Figure 1) which tap into threaded bores cored in the front casing section. The front casing section 15 comprises the front wall 15a, the left and right hand walls 15b and 15c, and the top and bottom walls 15d and 15e. Formed in the upper portion of the front wall 15a is the sight window 21 in rear of which is secured the window glass 22. The seal established by the gasket 18 and fastening screws 19 results in the interior of the meter housing constituting a sealed or substantially closed plenum chamber 20, which only has external communication through admission and discharge openings in opposite side walls of the instrument housing, as we shall later describe. When the instrument is in operation measuring the velocity of a prevailing air flow a pressure is created in this plenum chamber which is higher than the surrounding atmospheric pressure.

The curved air channel, piston type of vane, movement mounting shaft, swinging pointer and dial card are all mounted as a sub-assembly 25 (Figure 4) upon the front side of the rear cover plate 16, and this sub-assembly is inserted into the front casing section in proper position in the act of mounting the rear cover plate 16 upon the back of the front casing section. The air channel in which the piston vane operates is indicated at 26, this channel comprising a straight upper section 26a and a curved lower section 26b which curves downwardly from the straight section through approximately 180°. The inlet end of this air channel 26 is indicated at 27 and the discharge end is indicated at 28, it being noted that the discharge end discharges into the closed plenum chamber 20 defined within the casing. The air channel 26 is preferably molded within a unitary plastic molding 30 having two upper attachment ears 31 and a lower attachment ear 32 threaded to receive screws 33 which pass through the rear cover plate 16 and secure the molded unit 30 to the front side of this cover plate. As will be seen from Figures 5 and 6, the air channel 26 is preferably of square box-like cross-section, and the molded unit 30 defines three sides of this air channel, the open fourth side of the channel being closed by the front face of the rear cover plate 16 when the molded unit 30 is secured to said cover plate. The air velocity to be measured enters the inlet end 27 of the air channel 26 through an adjustable range selecting device 35, the details of which we shall later describe. The air which discharges from the discharge end 28 of the air channel passes through the enclosed plenum chamber 20 of the casing to an outlet port 36 in the side wall 15c of the casing. A calibrating bleeder screw 37 leads from the upper portion of the air channel to the outlet port 36, the details of which bleeder screw will be later described.

Referring now to the piston type of vane and the pivoted movement of the meter, such vane is indicated at 40, consisting of a very thin plate composed of aluminum or other light metal, and being of rectangular outline to have a relatively close non-contacting fit within the curved portion 26b of the air channel. Figure 6 illustrates the vane swung substantially to its maximum position, approximately coincident with the discharge end 28 of the air channel, such view illustrating the close non-contacting fit of the vane within the channel. The vane is rigidly mounted upon the end of a curved supporting arm 41 which extends out through the discharge end 28 of the curved air channel 26b. The other end of this arm is fixedly secured to the rotatable pivot shaft 42 which pivotally supports the moving system of the meter. As shown in Figure 6, the rear end of the shaft has bearing support in an adjustable bearing 43 which is mounted in a web portion 44 formed centrally of the molded unit 30. The curvature of the circular air channel 26b is formed on a radius which is concentric with the axis of the pivot shaft 42, and the cross-sectional dimensions of this curved air channel are substantially uniform from end-to-end, so that the piston vane 40 maintains substantially the same clearance from the curved walls and from the side walls in the different positions of the vane. The front end of the pivot shaft 42 is pivotally mounted in a bearing 45 which has threaded support in a supporting arm 46. This supporting arm is rigidly secured to a block portion 47 extending forwardly from the molded unit 30 (Figure 4) by rivets or headed pins 48, the rear ends of which appear on the inner side of the curved air channel in Figure 5. A hub structure 51 on the shaft 42 carries two oppositely extending balancing arms 52 and 53, a pointer 54, and a hair spring actuating arm 55. Mounted upon the balancing arms 52, 53 and upon the pointer arm 54 are small tightly fitting coil springs 57 which can be shifted frictionally to different points along their respective arms for balancing the meter movement. The arm 55 has connection with the inner end of a spiral hair spring 58 which encircles the shaft 42. The outer end of this hair spring is attached to a rotatable adjusting arm 59 which is adjustably mounted under the outer nut 45' of bearing 45. As shown in Figure 4, this adjusting arm 59 has a slot 61 therein into which extends an eccentrically mounted pin 62 projecting rearwardly from a zero adjusting screw 63 mounted in the front wall 15a of the casing. Rotation of this zero adjusting screw 63 is operative to increase or decrease the tension on the hair spring and thereby adjust the normal or zero position of the pointer 54 with respect to the scale card 65.

This card or dial 56 preferably consists of an aluminum plate which is secured to the front side of the molded unit 30 by screws 66. These screws also mount bumper stops 67 in the form of spring arms which serve to limit the range of throw of the pointer 54. As shown in Figure 1, inscribed on the front of the dial face are a high range scale 68 and a low range scale 69. The high range is shown as extending from 0 to 2500 feet velocity per minute and the low range is shown as extending from 0 to 500 feet per minute, but it will be understood that these ranges are merely exemplary.

Referring now to the range selecting device 35 which is adjusted to adapt the instrument to either of these scale ranges, it will be seen from Figure 5 that such device comprises a tubular fitting 71 having an axial bore 72 therethrough, the front end of this fitting being provided with an outwardly extending flange 73, and the other end being provided with a reduced thread 74. The reduced threaded end is passed through an opening 75 in the side wall 15b of the casing section, and is threaded into a threaded bore 76 which is formed in the end of the molded unit 30 in line with the air channel 26a. In the assembly of the meter, the back cover plate 16 with the sub-assembly 25 mounted thereon is placed within the housing section 15, and thereafter the fitting 71 is passed through the opening 75 and is threaded into the opening 76 of the molded unit 30. This serves to rigidly join the molded unit to the front housing section 15, and also serves to prevent any of the velocity air from entering the air channel 26 except through the bore 72 of the fitting 71. The meter is adjusted either to the high range scale or to the low range scale by rotating a front cap 78 which is mounted over the front end of the fitting 71. The front of this cap is provided with a central opening 79 which aligns with the bore 72 of the fitting, and the periphery of the cap has a rearwardly extending flange 81 which is crimped over a spring washer 83 bearing against the back of the flange 73, whereby the cap 78 can be easily rotated relatively to the fitting, but will frictionally remain in either of its two adjusted positions. Interposed between the front face of the fitting flange 73 and the inner surface of the cap 78 is a swinging segment 84 having two metering orifices 85 and 86 therein (Figure 7). Rotation of the cap 78 is operative to swing either one of these orifices 85 or 86 selectively into registration with the outer opening 79 and bore 72. This operation is effected by pivoting the segment 84 to the flange 73 and arranging the cap 78 to transmit swinging movement to the segment. Such is accomplished by providing a pivot lug 87 projecting rearwardly from the segment 84 into a pivot opening 88 in the flange 73; and by providing an actuating lug 89 projecting rearwardly from the rotatable cap 78 and engaging in an enlarged opening 91 in the segment 84. Rotation of the cap in one direction operates through the crank pin action of the pin 89 in the opening 91 to swing the segment 84 into the dotted line position shown in Figure 7, in which position the large orifice 86 is in effective position corresponding to the low range scale; and rotation of the cap in the opposite direction is operative through this crank pin action to swing the segment to the right for shifting the smaller orifice 85 into effective position, corresponding to the high range adjustment of the instrument. Suitable legends or indicia on the scale 65 indicate to the user which aperture should be employed for the high range scale and which for the low range scale.

Referring now to the adjustable bleeder 37 for calibrating the meter, it will be seen from Figure 5 that this device comprises a screw portion 93 which screws into a threaded bore 94 formed in the molded unit 30 at a point anterior to the normal position of the piston vane 40 and preferably substantially in alignment with the straight upper channel section 26a and range selecting inlet device 35. This screw is formed with a reduced extension 95, and a bore 96 extends from the front of the screw back into this reduced extension. A slot 97 is cut diametrically through or across the reduced extension 95 to intersect the bore 96. A bleeder passageway 98 extends from the air channel 26a into the threaded bore 94. It will be evident that by threading the screw 93 inwardly or outwardly the rear end of the reduced extension 95 can be moved toward or away from the end of the bleeder passageway 98, thereby decreasing or increasing the amount of air which bleeds from this passageway around the end of the reduced extension 95 and through the slot 97 and bore 96 to the plenum chamber 29 and thence to the outlet port 36. A compression spring 99 confined in rear of the head portion of the screw serves to hold the screw in its different positions of adjustment. This calibrating adjustment is preferably arranged so that it is not accessible to tampering from the exterior of the meter, but instead requires that the rear cover plate be removed and the sub-assembly 25 removed before access can be had to the screw 93. The outlet port 36 preferably has a screen 101 therein to prevent external access to the screw 93. It will be noted that all of the air bled out through the bleeder adjustment 37, and all of the air discharged from the discharge opening 28 of the air channel, both enter the closed plenum chamber 29 and then pass out of the plenum chamber and meter casing through the outlet port 36. It will be seen that in the use of the meter the inlet port 79 of the range selector device 35 is pointed directly at the source of air velocity, and substantially in line therewith, from which it will be seen that the outlet port 36 is then on the posterior side of the meter housing with respect to the moving air stream.

In Figure 9 we have illustrated an improved construction and arrangement of retaining clip for retaining the window glass 22 in the sight window 21. Two of these clips 104 are preferably employed, one at each side edge of the glass. The clip is punched out of thin sheet metal, and is formed with a laterally projecting flange 105 at one end and an oppositely extending flange 106 at the other end. The window glass is placed in the sight window and the clips are then brought to bear against the glass, the flange 105 of each clip bearing against the side edge of the glass, and the rear flange 106 of each clip being snapped into a slot 107 which is molded in each side wall 15b, 15c of the casing section. Figure 10 illustrates one of these clips prior to mounting in the meter, from which it will be seen that the front flange 105 initially has an outward angle, and the rear flange 106 initially has a reverse angle, prior to assembly in the meter. The clips are preferably made of Phosphor-bronze, with a spring temper or some degree of resiliency. The outward angle of the front flange 105 exerts an outward pressure on the glass, and the reverse angle on the rear flange exerts a sidewise biasing action on the outer front corner or end 108 of the clip in the act of straightening out the rear flange by inserting it into the slot 107. This sidewise biasing action crowds the outer corner or end 108 against the side wall 15b of the housing, causing it to hug this side wall and remain in place without any additional fastening. This greatly simplifies the mounting of the glass, and also simplifies the removal and substitution of a new glass in the event of breakage.

At the inner end of the fitting 71 we have shown a diffusing screen 110 which is an optional feature that may or may not be used, as desired. The purpose of this screen is to diffuse the air flow and thereby avoid turbulence in the air channel 26. We have found that satisfactory results are obtained when this screen is of the commercially available type designated as 40 mesh electro-formed screen (80% open area), but it will be understood that this is not limitative. The screen is held in place by a snap ring 111.

The meter can also be constructed in a more simplified embodiment having only a single range scale. In such embodiment, the selective range scale device 35 is substituted by a simple threaded plug having a single fixed orifice therein of calibrated size. In each of these embodiments, the adjustable bleeder 37 enables full scale calibration to be had. The diffusion screen 110 may also be employed in this simplified plug.

While we have illustrated and described what we regard to be the preferred embodiments of our invention, nevertheless it will be understood that such are merely exemplary and that numerous modifications and rearrangements may be made therein without departing from the essence of the invention.

We claim:

1. In an air velocity meter, the combination of a casing, means forming a curved air channel in said casing, a piston type of movable vane responding to air flow through said channel, indicating means actuated by said vane, and a range selecting device controlling the entrance of air to said air channel, said range selecting device comprising an apertured plug carried by said housing at the inlet end of said air channel, an apertured cap rotatably mounted on said plug, friction means for frictionally holding said cap in its different rotated positions of adjustment, a movable plate disposed between said plug and said cap and having a plurality of range selecting apertures therein, and means responsive to rotation of said cap on said plug for shifting said plate selectively to bring different range selecting apertures into operative position controlling the air stream entering said air channel.

2. In an air velocity meter, the combination of a casing, means forming an air channel in said casing through which an air stream is adapted to flow, said channel being substantially closed on all sides, velocity indicating means, a piston type of vane moving within said air channel and operatively connected with said indicating means through the discharge end of said channel, and a range selecting device controlling the entrance of air to the inlet end of said channel, said range selecting device comprising a tubular plug carried by said housing at the inlet end of said air channel, an apertured cap rotatably mounted on the outer end of said plug, a movable segment disposed between said plug and said cap and having a plurality of range selecting apertures therein, means pivotally connecting said segment to said plug, and crank pin means responsive to rotation of said cap for swinging said segment laterally to bring different range selecting apertures into registration with the tubular bore through said plug.

3. In an air velocity meter, the combination of a casing, means forming an air channel in said casing, a movable vane responding to air flow through said channel, indicating means actuated by said vane, said channel forming means having a bleeding passageway leading from said channel at a point anterior to the normal position of said vane and a counterbore in line with said bleeding passageway, said bleeding passageway terminating in a port opening into said counterbore, a bleed screw having threaded mounting in said counterbore adjacent to said port whereby the threading of said screw outwardly or inwardly in said counterbore increases or decreases the area of port opening, said screw having an axial bore therein and a transverse slot establishing communication between said axial bore and said counterbore, whereby air discharging through said adjustable port passes out through said counterbore, transverse slot and axial bore, and a compression spring for holding said bleeder screw in its different positions of adjustment.

4. In a portable air velocity meter of the class described capable of being held in the hand and of being inclined at different operating angles during use, the combination of a substantially rectangular casing having two opposite side walls and having an air inlet port in one side wall and an air outlet port in the opposite side wall, whereby said inlet and outlet ports can be aligned with free atmospheric air currents, said casing being otherwise substantially sealed so that its interior space functions as a plenum chamber in the operation of the meter, channel forming means forming a velocity measuring channel in said casing comprising a substantially straight upper channel section and a circularly curved lower channel section, said channel sections intersecting substantially tangentially and said lower section curving reversely back through approximately 180° to discharge under said upper section, said upper channel section receiving the air entering through said inlet port, a rotatable shaft mounted below said straight channel section and concentrically of said curved channel section, a curved arm extending from said shaft and entering said curved channel section through the discharge end thereof, a piston type of vane mounted on said arm for arcuate swinging movement in said curved channel section substantially out of contact with the side walls thereof, indicating means actuated by said vane, means forming a bleeder passageway extending substantially in continuation of said straight upper channel section at a point anterior to the normal position of said vane, whereby to by-pass around said vane a portion of the air entering through said inlet port, and adjusting means carried by said channel forming means for adjusting the by-pass volume of said bleeder passageway, the outlet end of said curved lower channel section and the outlet end of said bleeder passageway both discharging into said plenum chamber and said plenum chamber in turn discharging from said casing through said air outlet port.

5. In a portable air velocity meter of the class described capable of being held in the hand and of being inclined at different operating angles during use, the combination of a substantially rectangular casing having two opposite side walls and having an air inlet port in one of said side walls and an air outlet port in the opposite side wall, whereby said inlet and outlet ports can be aligned with free atmospheric air currents, said casing being otherwise substantially sealed so that its interior space will function as a plenum chamber in the operation of the meter, channel forming means forming a velocity measuring channel in said casing comprising a substantially straight channel section and a circularly curved channel section, said channel sections intersecting substantially tangentially and said curved section curving reversely back through approximately 180° from said straight section, said straight channel section receiving the air entering through said inlet port, a rotatable shaft mounted concentrically of said curved channel section, a curved arm extending from said shaft and entering said curved channel section through the discharge end thereof, a piston type of vane mounted on said arm for arcuate swinging movement in said curved channel section, indicating means actuated by said vane, balancing means carried by said shaft for balancing said vane and said indicating means, means forming a bleeder passageway extending from said straight channel section at a point anterior to the normal position of said vane, whereby said bleeder passageway by-passes a portion of the air entering through said inlet port around said vane, and adjusting means carried by said channel forming means for adjusting the by-pass volume of said bleeder passageway, the outlet end of said curved channel section and the outlet end of said bleeder passageway both discharging into said plenum chamber, and said plenum chamber in turn discharging from said casing through said air outlet port.

6. A portable air velocity meter as claimed in claim 4 including a range selecting device mounted on the casing to control the entrance of air to said velocity measuring channel.

7. A portable air velocity meter as claimed in claim 5 including a range selecting device mounted on the casing to control the entrance of air into said air inlet port.

References Cited in the file of this patent

UNITED STATES PATENTS

| Number | Name | Date |
|---|---|---|
| 529,191 | Recknagel | Nov. 13, 1894 |
| 1,401,887 | Davis | Dec. 27, 1921 |
| 1,582,865 | Bristol | Apr. 27, 1926 |
| 1,617,614 | York | Feb. 15, 1927 |
| 1,788,976 | Beraud et al. | Jan. 13, 1931 |
| 1,946,275 | Collins | Feb. 6, 1934 |
| 2,060,848 | Boyle | Nov. 17, 1936 |
| 2,130,863 | Stickney et al. | Sept. 20, 1938 |
| 2,207,747 | Manarik et al. | July 16, 1940 |
| 2,219,406 | White | Oct. 29, 1940 |
| 2,315,185 | Boyle | Mar. 30, 1943 |
| 2,390,384 | Poole | Dec. 4, 1945 |
| 2,463,844 | Anderson | Mar. 8, 1949 |
| 2,477,705 | Sweet | Aug. 2, 1949 |

FOREIGN PATENTS

| Number | Country | Date |
|---|---|---|
| 570,403 | Great Britain | July 5, 1945 |
| 613,282 | France | Aug. 20, 1926 |
| 748,247 | France | Apr. 10, 1933 |